United States Patent
Kiessner-Haiden

(10) Patent No.: US 8,645,036 B2
(45) Date of Patent: Feb. 4, 2014

(54) METHOD FOR CONTROLLING A CLUTCH UNIT

(75) Inventor: Martin Kiessner-Haiden, Lebring (AT)

(73) Assignee: Magna Powertrain AG & Co KG, Lannach (AT)

( * ) Notice: Subject to any disclaimer, the term of this patent is extended or adjusted under 35 U.S.C. 154(b) by 309 days.

(21) Appl. No.: 12/995,822

(22) PCT Filed: May 26, 2009

(86) PCT No.: PCT/EP2009/003728
§ 371 (c)(1),
(2), (4) Date: Mar. 23, 2011

(87) PCT Pub. No.: WO2009/146815
PCT Pub. Date: Dec. 10, 2009

(65) Prior Publication Data
US 2011/0166760 A1    Jul. 7, 2011

(30) Foreign Application Priority Data
Jun. 3, 2008   (DE) .......................... 10 2008 026 554

(51) Int. Cl.
*G06F 7/00*   (2006.01)
(52) U.S. Cl.
USPC ............................................ 701/68; 477/176

(58) Field of Classification Search
USPC ......... 701/68, 51; 192/70.252, 111.19, 89.23, 192/3.3, 3.29; 477/176, 180, 109
See application file for complete search history.

(56) References Cited

U.S. PATENT DOCUMENTS

2002/0038747 A1 * 4/2002 Huschka et al. ........... 192/53.34
2009/0099739 A1   4/2009 Hara

FOREIGN PATENT DOCUMENTS

| | | |
|---|---|---|
| DE | 10236540 A1 | 2/2003 |
| DE | 10306896 A1 | 8/2004 |
| EP | 1630442 | 3/2006 |
| EP | 2048400 | 4/2009 |
| JP | 02-159420 | 6/1990 |
| JP | 7006561 B | 1/1995 |
| JP | 2002-168270 A | 6/2002 |
| JP | 2004-36822 | 2/2004 |
| WO | 2006/100399 A | 9/2006 |

OTHER PUBLICATIONS

Japanese Office Action Undated.

* cited by examiner

*Primary Examiner* — Thomas Black
*Assistant Examiner* — Luke Huynh
(74) *Attorney, Agent, or Firm* — Dickinson Wright PLLC

(57) ABSTRACT

A method for controlling a clutch unit for a drive train of a motor vehicle wherein the temperature in the friction clutch is ascertained and a characteristic curve of the friction clutch is adapted as a function of the ascertained temperature.

9 Claims, 7 Drawing Sheets

METHOD FOR CONTROLLING A CLUTCH UNIT

CROSS-REFERENCE TO RELATED APPLICATIONS

This application is a U.S. National Stage of International Application No. PCT/EP2009/003728 filed May 6, 2009 which claims the benefit of and priority to German Application No. 10 2008 026 554.3 filed Jun. 3, 2008. The entire disclosures of each of the above applications are incorporated herein by reference.

The present invention concerns a method for controlling a clutch unit for a drive train of a motor vehicle, wherein the clutch unit has at a minimum, a wet friction clutch for controllable transmission of a torque from an input element to an output element of the clutch unit, oil for cooling the friction clutch, and an actuator for actuating the friction clutch. The invention also concerns a torque transmission arrangement that has an input element, an output element, a control unit, and a clutch unit of the aforementioned type.

A clutch unit of this nature is used, for example, in a transfer case of a motor vehicle with four-wheel drive for controllable transmission of a drive torque to a primary axle and/or a secondary axle of the motor vehicle. In the case of a so-called "torque on demand" transfer case, the wheels of the primary axle are continuously driven while a portion of the drive torque can be selectively transmitted to the wheels of the secondary axle by means of the aforementioned clutch unit. The transfer case can also be designed as a controllable center differential in which the clutch unit is associated with a differential lock in order to adjust the distribution of the drive torque in the longitudinal direction of the vehicle. A clutch unit of the aforementioned type can also be used in a torque transmission arrangement, which, in a motor vehicle with a continuously driven front axle, permits the transmission of part of the torque to the rear axle, wherein the unit is located on the front axle differential or the rear axle differential, for example. Such different applications and arrangements are known from U.S. Pat. No. 7,111,716 B2, for example.

A clutch unit of the aforementioned type can also act in the transverse direction of the motor vehicle, for example for a differential lock of an axle differential or in a torque superposition arrangement of an axle differential (known as "torque vectoring"). In all of the aforementioned cases, the clutch unit can frictionally connect a rotating input element (e.g., input shaft) and a rotating output element (e.g., output shaft), particularly in order to transmit a drive torque. As an alternative thereto, the clutch unit can be configured as a brake with a stationary input element or a stationary output element, particularly in order to transmit a braking torque.

In the aforementioned applications of the clutch unit, the clutch unit is located after the main transmission of the drive train (e.g., after the manual or automatic transmission or CVT transmission) with respect to the direction of power flow. Normally, the clutch torque—which is to say the torque transmitted by the friction clutch—is variably adjusted as a function of the relevant driving situation. Thus, a change in the torque to be transmitted by the clutch unit takes place in accordance with the requirements of vehicle dynamics, which may depend on such factors as the driving situation or environmental influences (e.g., smooth road surface with slip of the drive wheels occurring). This requires not only controlled engagement of the friction clutch, but frequently also requires a relatively long period of operation with precisely adjusted clutch torque, for which reason the friction clutch usually is designed as a wet plate clutch in the aforementioned applications. Typically, the friction clutch is integrated into a housing, which contains oil for cooling and lubricating the frictional components. For example, an oil sump is provided at the bottom of the housing, whence an oil pump continuously pumps oil during the operation of the clutch and drips it on the friction surfaces. The oil returns to the oil sump from the friction surfaces.

The clutch unit further includes an actuator for actuating the friction clutch. The actuator often has an electric motor attached to the housing of the clutch unit and serves to move the clutch plates into a predetermined engagement position in response to a required torque to be transmitted between the input element and the output element of the clutch unit.

A clutch unit of the aforementioned type and a method for calibrating such a clutch unit are known from WO 2003/025422 A1 (corresponding to U.S. Pat. No. 7,032,733 B2), the content of which is expressly incorporated in the disclosure content of the present application. As is described in greater detail in WO 2003/025422 A1, the setting of a specific desired clutch torque does not necessarily require the provision of direct torque control (with the measured actual clutch torque as the control variable). Instead, the control of the friction clutch can take place by indirect means through controlling the position of the actuator based on an appropriate calibration of the clutch unit. Thus, to set the desired torque to be transmitted, the angle of rotation of the electric motor, for example, or another position variable of the actuator, is employed as a control variable and is set to a value that corresponds to the desired clutch torque. To this end, a clutch torque/actuator position dependence is empirically determined, which is stored as a characteristic curve, for example in the form of a table (lookup table, LUT) or a function (which is to say an algorithm). Using this dependence, the applicable target value of the relevant position variable of the actuator (e.g., angle of rotation) is determined for a specific torque requirement and is regulated.

In this context, the problem arises that the torque actually transmitted at a specific actuator position depends on the coefficient of friction of the clutch plates, and this can change during vehicle operation. This change cannot be taken into account by the aforementioned static relationship between torque requirement and actuator position. Along with the speed difference between the input element and the output element of the clutch unit, the temperature of the clutch plates or that of the oil present on the clutch plates, in particular, affects the coefficient of friction. Since the temperature relationships in the friction clutch can change in accordance with operating conditions, undesirable deviations between the commanded clutch torque (target value) and the clutch torque actually transmitted (actual value) can thus occur. At low temperatures, the magnitude of the coefficient of friction can be so high that the excessive torque can result in damaging stress on transmission components, warping in the drive train, or excessive oil degradation.

The object of the invention is to reduce the deviations between the target value and the actual value of the clutch torque, and thus to increase the accuracy of the clutch control. Furthermore, unacceptably high stress on components of the clutch unit is to be avoided.

This object is attained by a method for controlling a clutch unit with the features from claim 1, and in particular by the following steps:
  ascertaining the temperature in the friction clutch;
  adapting, as a function of the ascertained temperature, a characteristic curve of the friction clutch that describes the dependence of a clutch torque on an actuator control variable; and controlling the clutch unit in accordance with the characteristic curve by means of the actuator.

According to the invention, therefore, a dynamic adaptation of the clutch control takes place as a function of the clutch temperature, which constitutes an important influencing variable with regard to the relationship between the actuator control variable and the torque transmitted. This can be achieved in a simple manner in that a temperature associated with the clutch unit is ascertained on an ongoing basis, and the characteristic curve of the friction clutch, which is customarily stored in a nonvolatile memory, is adapted accordingly. By means of such an adaptation, temperature-induced deviations of the clutch characteristic from the normal behavior can be compensated for, by which means the accuracy of adjustment of the clutch unit is increased. The relationship between clutch temperature and the torque deviation to be compensated can be calculated or determined empirically, and can be present in the form of a lookup table, for example. As a result of adapting the characteristic curve, the clutch control can be corrected rapidly and reliably. No complicated calculations or additional regulating mechanisms are necessary. In particular, the adaptation of the characteristic curve can be performed on a periodic or continuous basis during operation of the clutch.

Preferably, a temperature of the oil is detected for ascertaining the temperature in the friction clutch. Because the oil is directed onto the plates in continuous circulation during operation of the friction clutch, and rapidly flows back into the reservoir of the oil sump after exchanging heat with said plates, the temperature of the oil sump constitutes a representative and easily accessible thermodynamic parameter of the friction clutch. The temperature of the oil not only permits direct inferences concerning its viscosity, which affects the coefficient of friction, but can also serve as a starting point for estimating or calculating other temperatures of the friction clutch, for example the temperature of the clutch plates.

The temperature of the oil can be sensed in a direct and reliable manner by a temperature sensor, located in an oil sump of the clutch unit for example. This suggest itself in particular for clutch units in which such a temperature sensor is provided in any case, for example in order to output a warning signal in the event of impending overheating of the friction clutch. While the frictional clutch plates generally are inaccessible for direct temperature measurement, a temperature sensor can be placed in the oil sump in a simple manner.

The temperature of the oil can also be calculated on the basis of a heat flow model. Such a heat flow model can be based on a calculation of the difference between a thermal input power and a thermal output power of the clutch unit, for example, wherein the clutch torque and the speed of the input element and/or the output element can be taken into account. The advantage of such computationally based temperature determination is that no additional sensors are required. Moreover, various measured quantities already provided as part of vehicle control, such as the speeds of the input element and output element, for example, can be used in advantageous fashion as input parameters for the heat flow model.

Regardless of the method of ascertaining or calculating the oil temperature, the determination of the temperature in the friction clutch can also take into account a heat input that corresponds to the power dissipation generated in the friction clutch. In other words, starting from the oil temperature, the temperature in the friction clutch is inferred by means of the heat input into the friction clutch. By this means, a still better accuracy of the desired temperature compensation can be achieved, and in particular the specific nature of the friction clutch used can be taken into account, for example in order to make a distinction based on whether a plate clutch with steel plates or paper plates is used.

For the above-described offsetting of the oil temperature with the heat input, a value corresponding to the oil temperature can be added to or multiplied by a value corresponding to the heat input, for example. The aforementioned heat input can be ascertained as a function of the clutch torque (target value of the torque to be transmitted or actual value of the torque to be transmitted) and a difference between the speed of the input element and the speed of the output element of the clutch unit, for example. In particular, the aforementioned heat input can be determined from a product of the clutch torque and the speed difference, wherein an empirically determined constant that ultimately corresponds to a thermal conductivity coefficient can be taken into account as an additional factor. In addition, a time integral can be formed by means of the aforementioned product of clutch torque and speed difference between input element and output element.

Preferably, a slope and/or an offset are modified for the adaptation of the clutch characteristic curve. In particular, for adapting the characteristic curve, a slope correction value and/or an offset correction value can be determined as a function of the ascertained temperature, wherein a target value of the clutch torque is multiplied by the slope correction value in order to obtain a modified target value of the clutch torque, wherein a temporary target value of the relevant actuator control variable is determined on the basis of the characteristic curve as a function of the modified target value of the clutch torque, and wherein the offset correction value is added to the temporary target value of the actuator control variable in order to determine a target value of the actuator control variable. The stored characteristic curve itself remains unchanged in such a procedure, since only two parameters associated with the characteristic curve are updated. In this way, a complete regeneration of the characteristic curve, with corresponding computational and storage effort, is avoided. The aforementioned slope correction value and the aforementioned offset correction value can be determined empirically and stored in simple lookup tables.

Preferably, for control of the clutch unit, a target value of the relevant actuator control variable is determined as a function of a target value of the clutch torque, and the determined target value of the actuator control variable is regulated, wherein an actual value of the actuator control variable is sensed and is compared with the target value. In general, the actuator control variable is more easily accessible to sensing by measurement means than the clutch torque itself, so that it is easier to provide regulation that relates to the target value and actual value for the selected actuator control variable. The actuator control variable can be an actuator position (in particular, an angle of rotation) or a hydraulic pressure, for example.

The invention also relates to a torque transmission arrangement that has an input element, an output element, a clutch unit, and a control unit, wherein the clutch unit has, at a minimum, a wet friction clutch for controllable transmission of a torque from the input element to the output element, oil for cooling the friction clutch, and an actuator for actuating the friction clutch, wherein the control unit is designed to ascertain the temperature in the friction clutch, adapt, as a function of the ascertained temperature, a characteristic curve of the friction clutch that describes the dependence of a clutch torque on an actuator control variable, and to control the clutch unit in accordance with the characteristic curve by means of the actuator.

The inventive clutch unit or torque transmission arrangement can be used in different configurations in order to transmit a torque along a drive train of a motor vehicle, as was explained at the outset. The invention is explained below with reference to the drawings, in connection with a "torque on demand" transfer case solely by way of example.

Figure 1:
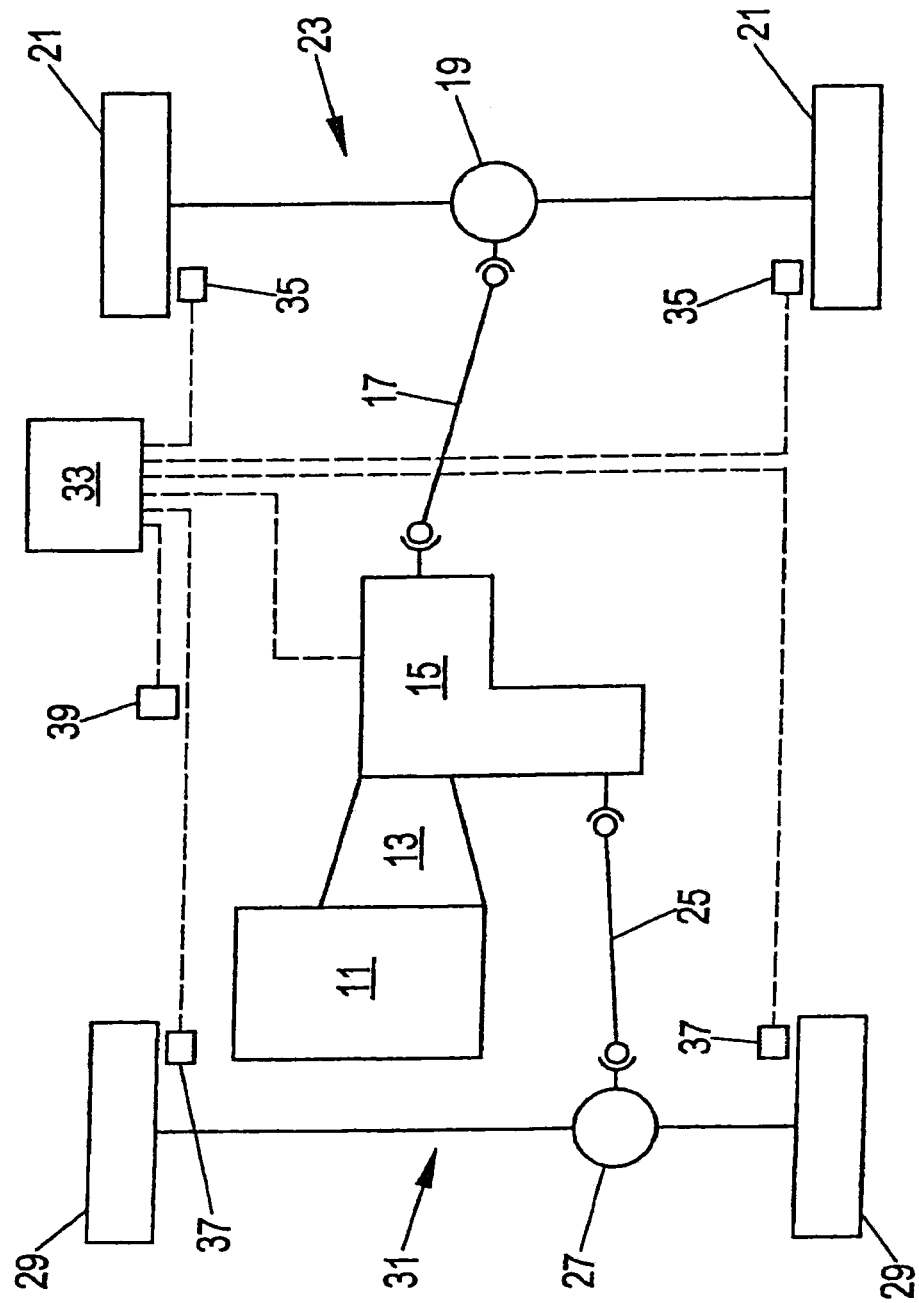
FIG. 1 shows a schematic view of a drive train of a motor vehicle.

FIG. 1 schematically shows a drive train of a motor vehicle with selectable four-wheel drive. The drive torque produced by an internal combustion engine 11 is delivered to a transfer case 15 through a main transmission 13 (manual transmission or automatic transmission). A first output of the transfer case 15 is coupled to a rear axle differential 19 through a drive shaft 17. In this way, the wheels 21 of the rear axle 23 are driven continuously. The rear axle 23 thus constitutes the primary axle of the motor vehicle. A second output of the transfer case 15 is coupled to a front axle differential 27 through a drive shaft 25. In this way, a portion of the drive torque of the internal combustion engine 11 can be selectively transmitted to the wheels 29 of the front axle 31. The front axle 31 thus constitutes the secondary axle of the motor vehicle.

Also shown in FIG. 1 is a vehicle dynamics controller 33. This is connected to wheel speed sensors 35, 37, which are associated with the wheels 21 of the rear axle 23 and the wheels 29 of the front axle 31. The vehicle dynamics controller 33 is also connected to additional sensors 39, for example a yaw-rate sensor. As a function of the signals from the sensors 35, 37, 39, the vehicle dynamics controller 33 generates a control signal, which is delivered to a control unit (not shown in FIG. 1) of the transfer case 15, in order to set a specific distribution of the drive torque between the two axles 23, 31 of the vehicle by this means. The aforementioned control signal is, in particular, a target value of a clutch torque, which is to say a torque requirement for a clutch unit of the transfer case 15.

Figure 2:
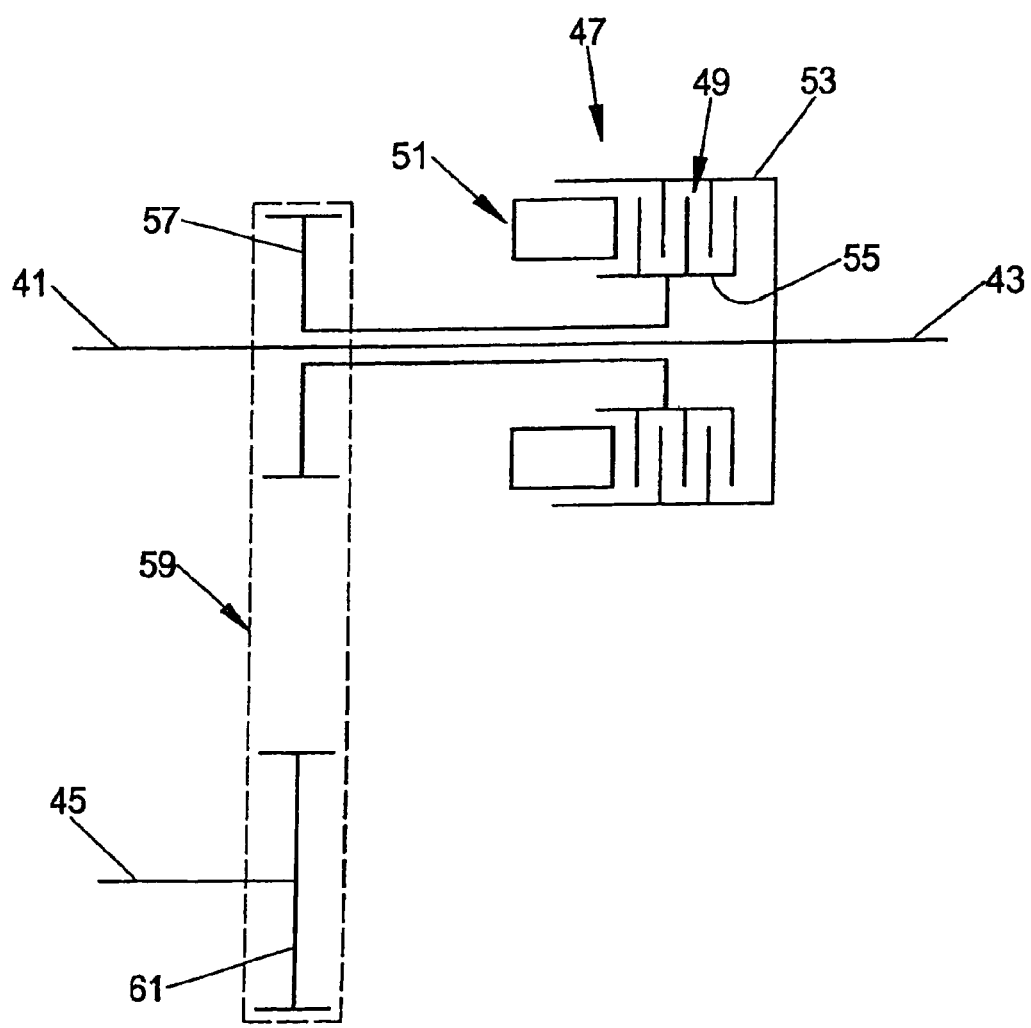
FIG. 2 shows a schematic view of a transfer case.

FIG. 2 shows a schematic cross-sectional view of the transfer case 15 from FIG. 1. The transfer case 15 has an input shaft 41, a first output shaft 43, and a second output shaft 45. The first output shaft 43 is coaxial to the input shaft 41 and is designed to be rotationally fixed therewith, preferably as a single piece. The second output shaft 45 is parallel to and offset from the input shaft 41.

The transfer case 15 has a clutch unit 47 with a friction clutch 49 and an actuator 51. The friction clutch 49 has a clutch basket 53 that is attached in a rotationally fixed manner to the input shaft 41 and the first output shaft 43 and that carries multiple clutch plates. The friction clutch 49 also has a rotatably supported clutch hub 55, which likewise carries multiple clutch plates that engage in an alternating arrangement with the plates of the clutch basket 53. The clutch hub 55 is connected in a rotationally fixed manner to an input gear 57 of a chain drive 59. An output gear 61 of the chain drive 59 is connected in a rotationally fixed manner to the second output shaft 45. A gear drive, for example with an intermediate gear between the aforementioned gears 57, 61, may be provided in place of the chain drive 59.

By actuating the actuator 51 in the engagement direction of the friction clutch 49, an increasing fraction of the drive torque introduced into the transfer case 15 through the input shaft 41 can be transmitted to the second output shaft 45.

Figure 3:
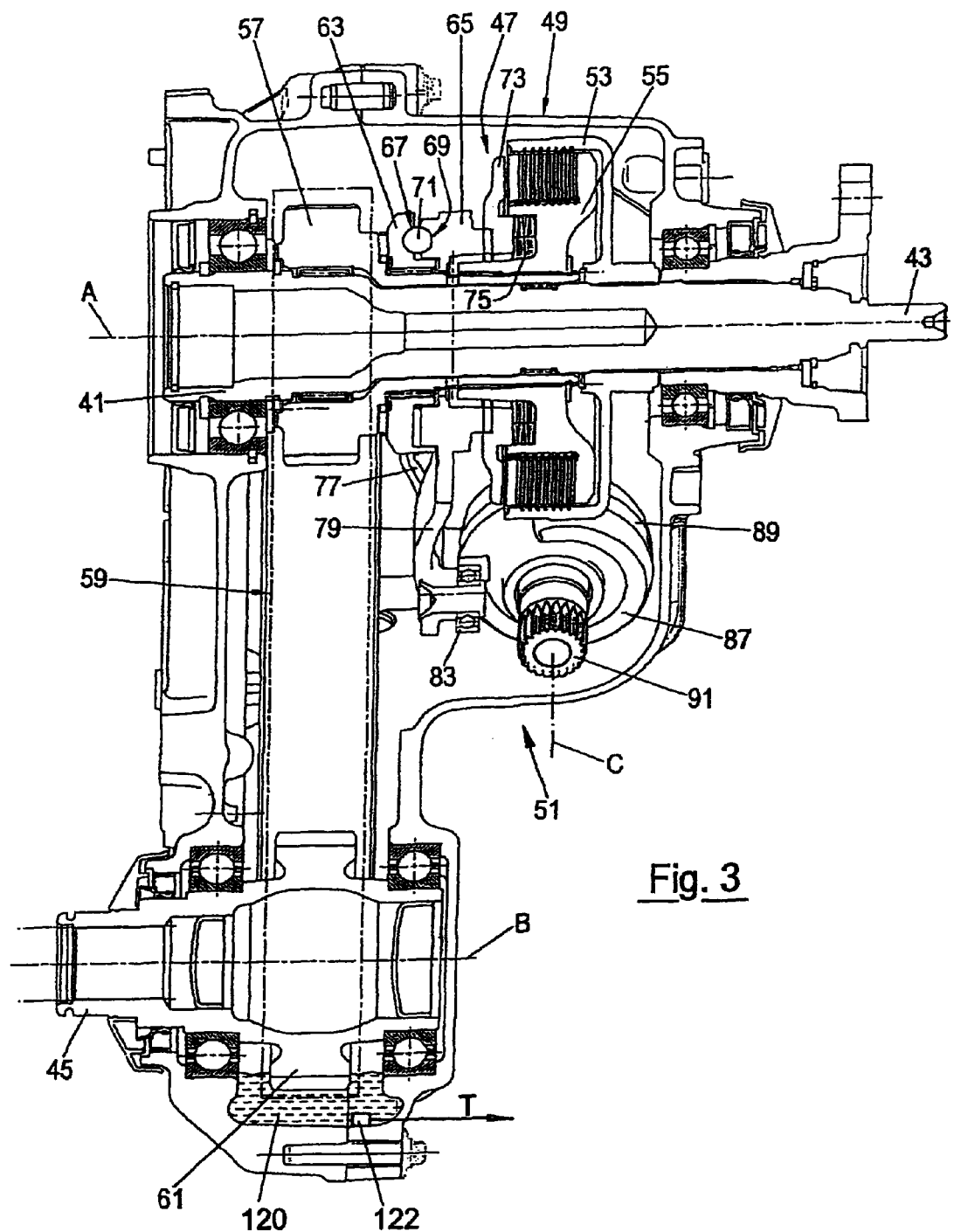
FIG. 3 shows a cross-sectional view of the transfer case from FIG. 2.

FIG. 3 shows details of the transfer case 15 from FIG. 2 in a cross-sectional view. In particular, it is evident that the actuator 51 has a bearing ring 63 and an adjusting ring 65, which are rotatably supported with respect to the axis of rotation A of the input shaft 41 and the first output shaft 43. The bearing ring 63 is axially supported on the input gear 57 by means of a thrust bearing. In contrast, the adjusting ring 65 is supported in an axially displaceable manner. The bearing ring 63 and adjusting ring 65 each have multiple ball races 67 and 69 on their sides facing one another. These ball races extend in the circumferential direction with respect to the axis A and are inclined in a ramp-like manner in the circumferential direction with respect to a plane perpendicular to the axis A, which is to say that the ball races 67, 69 have a depth that varies in the circumferential direction. In each case, a ball race 67 of the bearing ring 63 and a ball race 69 of the adjusting ring 65 are located opposite one another and enclose an associated ball 71. By rotating the bearing ring 63 and the adjusting ring 65 relative to one another, an axial displacement of the adjusting ring 65 can thus be accomplished, wherein the adjusting ring 65 works together with a pressure ring 73 of the friction clutch 49 through a thrust bearing. The pressure ring 73 is preloaded in the disengagement direction of the friction clutch 49 by means of a spring washer arrangement 75.

An actuating lever 77 or 79 is integrally formed on the bearing ring 63 and the adjusting ring 65, respectively. A roller 81 or 83 is rotatably supported at the free end of each relevant lever 77, 79. By means of the rollers 81, 83, the actuating levers 77, 79 work together with the two end faces 85, 87 of a disk cam 89, which is rotatable relative to an axis C. The end faces 85, 87 are inclined in the circumferential direction relative to a plane perpendicular to the axis C, i.e., the disk cam 89 is wedge-shaped in cross-section. By rotating the disk cam 89, the actuating levers 77, 79 can thus be moved in a scissoring manner in order to rotate the bearing ring 63 and the adjusting ring 65 relative to one another. The disk cam 89 has an integrally formed splined projection 91. By means of said projection, the disk cam 89 can be connected to an electric motor and associated reduction gear (not shown in FIG. 3) in a manner that is effective for driving.

In this way, by appropriate control of the aforementioned electric motor the disk cam 89 can be driven into a rotary motion so as to thereby pivot the actuating levers 77, 79 relative to one another. The rotation of the bearing ring 63 and the adjusting ring 65 relative to one another that is produced thereby causes an axial motion of the adjusting ring 65. The pressure ring 73 thus causes an engagement of the friction clutch 49, or—assisted by the spring washer arrangement 75—a disengagement of the friction clutch 49.

It is also evident from FIG. 3 that the bottom part of the housing of the transfer case 15 forms an oil sump 120, which accommodates oil for cooling and lubricating the friction clutch 47 and the other components of the transfer case 15. Located in the oil sump 120 is a temperature sensor 122, which outputs a signal T representing the temperature of the oil.

Figure 4:
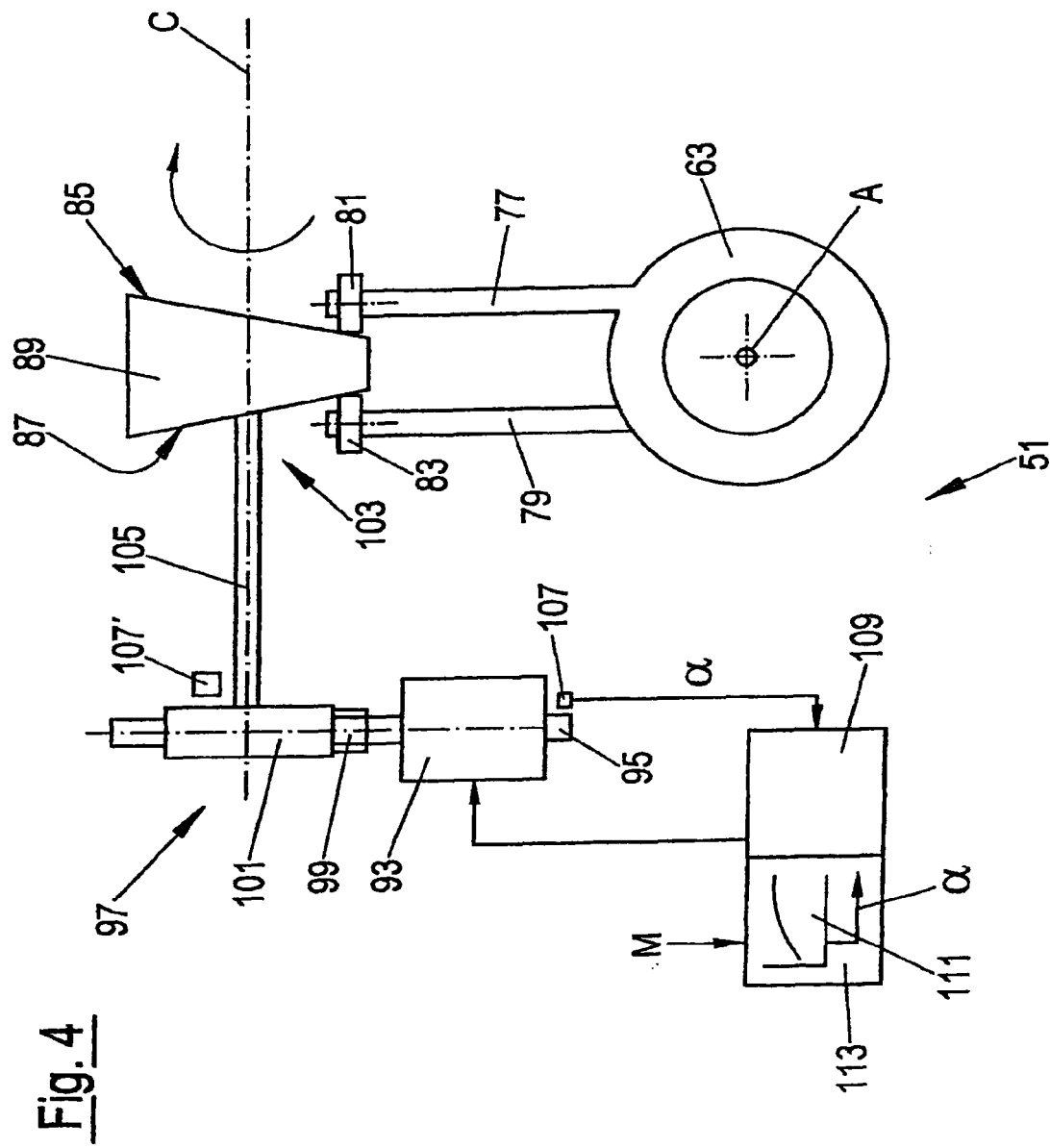
FIG. 4 shows a schematic view of a clutch actuator.

FIG. 4 shows the actuator 51 from FIG. 2 and FIG. 3 in a schematic view. The actuator 51 has a controllable electric motor 93 with an armature shaft 95, a reduction gearbox 97 with a worm 99 and worm wheel 101, and a deflection device 103. By means of the deflection device 103, a rotational motion of an output shaft 105 of the reduction gearbox 97 is converted into a translational, i.e., straight-line, motion of the pressure ring 73 (FIG. 3). The deflection device 103 comprises the disk cam 89 as well as the bearing ring 63 and the adjusting ring 65 with the actuating levers 77, 79 and the balls 71 as shown in FIG. 3. A sensor 107, which is designed as an incremental encoder for example, is located on the armature shaft 95 of the electric motor 93. Alternatively, as shown in FIG. 4, the sensor 107 may also be located on the output shaft 105 as a sensor 107'.

The sensor 107 produces a signal that corresponds to an actuator position value. In the exemplary embodiment shown, this is the actual angular position value $\alpha'$ of the armature shaft 95. This signal $\alpha'$ is delivered to a control unit 109 of the transfer case 15. The control unit 109 also receives a torque requirement M, which is to say a target value of the clutch torque, from the vehicle dynamics controller 33 of the motor vehicle (FIG. 1). From a torque/angular position characteristic curve 111, which is stored in a nonvolatile memory 113 of the control unit 109, the control unit 109 determines a target angular position value $\alpha$ with the aid of the torque requirement M. As a function of the difference between the target angular position value $\alpha$ and the actual angular position value $\alpha'$, the control unit 109 generates a control signal for the electric motor 93 in order to adjust the friction clutch 49 (FIGS. 2 and 3) accordingly. The control unit 109 thus acts as a position controller.

Figure 5:
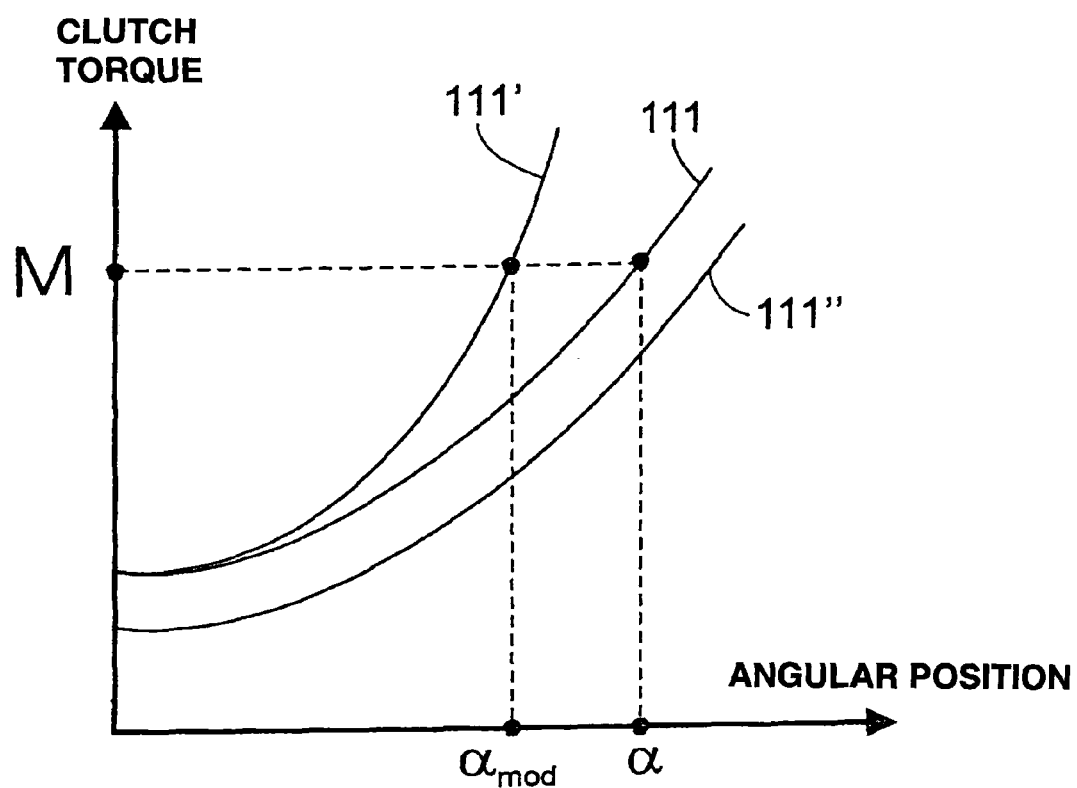
FIG. 5 shows, by way of example, one uncorrected and two corrected characteristic curves for describing the dependence of a clutch torque on an actuator position.

The control of the clutch unit 47 using the characteristic curve 111 will now be explained in detail with reference to FIG. 5 and FIG. 6. By way of example, the diagram shown in FIG. 5, in which the torque requirement (target clutch torque value) M is plotted as a function of the target angular position value $\alpha$, shows a characteristic curve 111 that was originally stored in the memory 113 of the control unit 109, as well as two characteristic curves 111', 111" adapted to compensate for the effect of temperature. When the control unit 109 receives a torque requirement M, the associated target angular position value $\alpha$ of the electric motor 93 can be determined by means of the characteristic curve 111. If a temperature compensation of the clutch control is to be performed as a result of the value of the oil temperature T generated by the temperature sensor 122 (FIG. 3) or calculated by means of a heat flow model, an adapted characteristic curve 111' whose slope is modified can now be used in place of the original characteristic curve 111. Use of the characteristic curve 111' results in the modified target angular position value $\alpha_{mod}$, which in the example shown is smaller than the unmodified target angular position value $\alpha$. Thus, in this case the friction clutch 49 is engaged to a lesser degree than is specified by the original characteristic curve 111, for example in order to account for a low clutch temperature. The characteristic curve 111" that is also shown depicts a different variant of the adaptation in which a modification of the offset of the originally stored characteristic curve 111 is performed, which corresponds to a parallel displacement in the actuator position/clutch torque diagram.

Adapting the characteristic curve 111 does not necessarily require overwriting the entire stored curve or its associated table. It is sufficient, for example, to multiply each torque requirement M by a temperature-dependent correction value and thereafter determine the target angular position value $\alpha$ using the originally stored characteristic curve 111. This procedure is equivalent to a change in the slope of the characteristic curve, so that this procedure corresponds to the adapted characteristic curve 111', for example.

Alternatively, it is also possible to first determine the target angular position value $\alpha$ based on the unaltered torque requirement M and the unmodified characteristic curve 111 and to increase or decrease the target angular position value $\alpha$ thus obtained by a temperature-dependent correction value. This procedure is equivalent to a change in the characteristic curve offset, so that this procedure corresponds to the parallel-displaced characteristic curve 111", for example. In the example shown in FIG. 5, the characteristic curve 111' with modified slope corresponds to a downward correction of the target angular position value, e.g., in order to prevent an excessive rise in the actual torque transmitted at low temperature. The characteristic curve 111" with modified offset corresponds to an upward correction of the target angular position value, such as is necessary to compensate for the reduced viscosity of the oil at high temperatures, for example. Depending on the application, it can also be advantageous to combine the changes in the offset and the slope with one another. The computation effort is reduced to a minimum by the means that during ongoing clutch operation only one numeric value is updated for the slope and/or for the offset.

Figure 6:
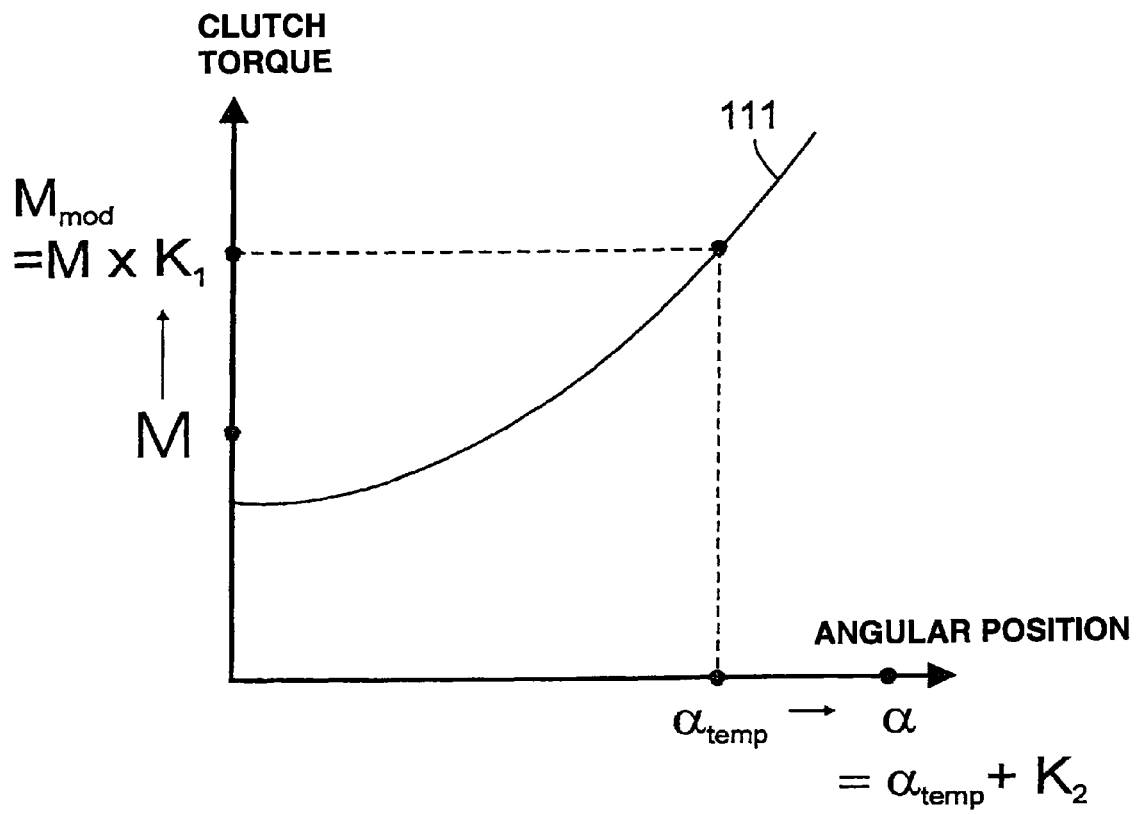
FIG. 6 shows, by way of example, the adaptation of a characteristic curve by means of a slope correction value and an offset correction value.

The characteristic curve adaptation can thus be designed in practice such that the characteristic curve 111 that has been stored a single time always remains unchanged, as is illustrated in FIG. 6. For adaptation, the current torque requirement M is multiplied by a slope correction value $K_1$ so that a modified torque requirement $M_{mod}$ results. Using the characteristic curve 111, the temporary target angular position value $\alpha_{temp}$ that corresponds to the modified torque requirement $M_{mod}$ is determined. Next, to obtain the desired target angular position value $\alpha$ corresponding to the adaptation, an offset correction value $K_2$ is added to the target angular position value $\alpha_{temp}$ that was determined. The slope correction value $K_1$ and the offset correction value $K_2$ associated with the current temperature T of the oil can in be retrieved from, for example, a simple, previously stored applicable lookup table that has been generated through one-time calibration of the relevant transfer case 15. In this case, the characteristic curve 111 stored in the memory 113 of the control unit 109 always remains unchanged. The slope correction value $K_1$ can also be less than one, so that the multiplication is equivalent to a division. Similarly, the offset correction value $K_2$ can be negative, so that the addition is equivalent to a subtraction.

In accordance with an advantageous refinement, the desired temperature compensation can additionally take place on the basis of a heat input that corresponds to the power dissipation generated in the friction clutch 49. In this case, the oil temperature T determined by means of the temperature sensor 122 (FIG. 3) is first corrected with regard to the aforementioned heat input before the above-described characteristic curve adaptation is performed using the corrected temperature value and, in particular, the aforementioned slope correction value $K_1$ and the aforementioned offset correction value $K_2$ are read out of an applicable lookup table. The aforementioned heat input can be calculated, in particular, as a function of a product of the torque requirement M and a difference between the speeds of the input shaft 41 and the second output shaft 45 (cf. FIGS. 2 and 3). These speeds are available in any case because of the signals from the wheel speed sensors 35, 37 (FIG. 1) without the need for additional sensors.

Figure 7:
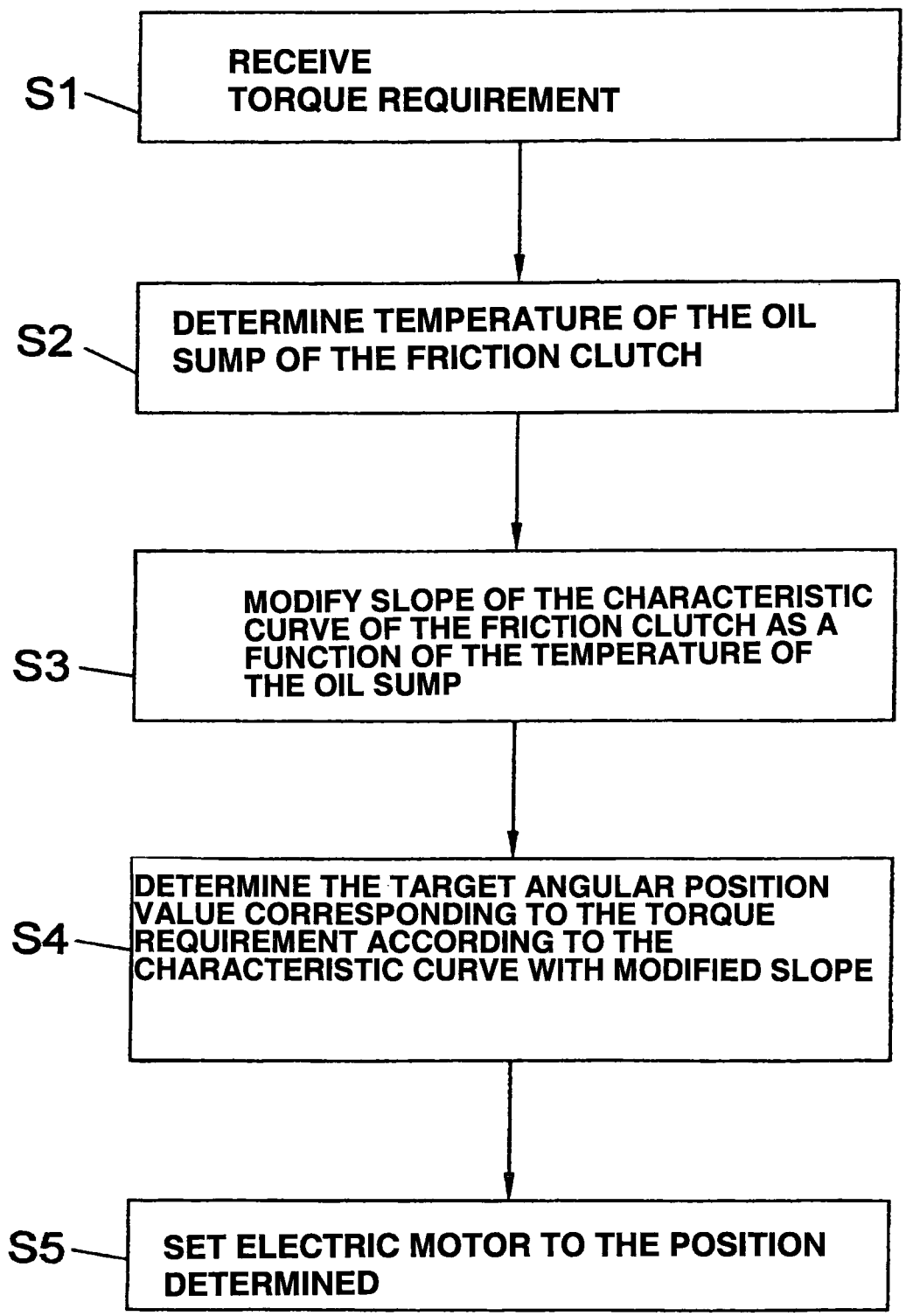
FIG. 7 shows a flow diagram of a method according to the invention for controlling a clutch unit.

An exemplary method for controlling a clutch unit taking into account the temperature T is described with reference to FIG. 7. In a step S1, the control unit 109 receives a current torque requirement M. In a step S2, the temperature T of the oil sump of the friction clutch is determined. As a function of the temperature T of the oil sump, an associated slope is retrieved from a lookup table in a step S3, and the characteristic curve 111 is modified in accordance with the retrieved slope. In a step S4, the characteristic curve 111' with modified slope is used to determine the corrected target angular position value $\alpha_{mod}$ associated with the required torque M. This corrected target angular position value is treated as the new position value to which the actuator is to be regulated, and the electric motor 93 is set to the appropriate position in a step S5.

Insofar as the adaptation of the characteristic curve 111 takes place through the use of correction values as described in connection with FIG. 6, the slope correction value $K_1$ and the offset correction value $K_2$ can be read out in step 3 as a function of the temperature T of the oil sump, wherein these values $K_1$, $K_2$ can be used ultimately in step 4 to determine the adapted target angular position value $\alpha$ based on the torque requirement M.

In this way, it is possible, for example, to take into account the fact that the viscosity of the lubricating oil decreases with increasing operating temperature of the clutch unit 47, thus changing the clutch characteristics. As a result of the compensation of the temperature influences, the accuracy of the clutch torque control can be increased. The determined temperature of the oil sump can also be used for additional control tasks as part of vehicle operation, as well. To this end, it can be output to a CAN bus, for example, in order to thus be available to other control units.

While the invention finds especially advantageous application in a transfer case with electromechanical actuation of the friction clutch, the invention is not limited to the above-described exemplary embodiment. Other arrangements in the drive train of a motor vehicle are also possible, as explained at the outset. Furthermore, the actuator 51 can be designed in a different manner than that described above in conjunction with the figures. For example, a different type of reduction gearbox 97 or a different type of deflection device 103 may be provided. In place of the electromechanical actuation of the friction clutch 49 shown, an electromagnetic, hydraulic, or electrohydraulic actuation may also be provided, for instance. In this case a pressure/clutch torque characteristic curve, for example, is adapted as a function of temperature in place of the angular position/clutch torque characteristic curve 111.

LIST OF REFERENCE CHARACTERS 11 internal combustion engine
13 main transmission
15 transfer case
17 drive shaft
19 rear axle differential
21 wheel
23 rear axle
25 drive shaft
27 front axle differential
29 wheel
31 front axle
33 vehicle dynamics controller
35 wheel speed sensor
37 wheel speed sensor
39 sensor
41 input shaft
43 first output shaft
45 second output shaft
47 clutch unit
49 friction clutch
51 actuator
53 clutch basket
55 clutch hub
57 input gear
59 chain drive
61 output gear
63 bearing ring
65 adjusting ring
67 ball race
69 ball race
71 ball
73 pressure ring
75 spring washer arrangement
77 actuating lever
79 actuating lever
81 roller
83 roller
85 end face
87 end face
89 disk cam
91 splined projection
93 electric motor
95 armature shaft
97 reduction gearbox
99 worm
101 worm wheel
103 deflection device
105 output shaft
107 position sensor
107' position sensor
109 control unit
111 clutch torque/angular position characteristic curve
111' characteristic curve with modified slope
111" characteristic curve with modified offset
113 memory
120 oil sump
122 temperature sensor
A axis of rotation
B axis of rotation
C axis of rotation
$\alpha$ target angular position value
$\alpha'$ actual angular position value
$\alpha_{mod}$ modified target angular position value
$\alpha_{temp}$ temporary target angular position value
M torque requirement
$M_{mod}$ modified torque requirement
$K_1$ slope correction value
$K_2$ offset correction value
T oil temperature

The invention claimed is:

1. Method for controlling a clutch unit for a drive train of a motor vehicle, the clutch unit including a wet friction clutch for controllable transmission of a torque from an input element to an output element of the clutch unit; oil for cooling the friction clutch; and an actuator for actuating the friction clutch; the method comprising the following steps:

ascertaining a temperature of the oil and wherein the oil temperature ascertained is offset with a heat input that corresponds to the power dissipation produced in the friction clutch;

adapting, as a function of the ascertained temperature, a characteristic curve of the friction clutch that describes the dependence of a clutch torque on an actuator control variable; and controlling the clutch unit in accordance with the characteristic curve by means of the actuator.

2. Method according to claim 1, wherein the temperature of the oil is sensed by a temperature sensor.

3. Method according to claim 2, wherein the temperature sensor is located in an oil sump of the clutch unit.

4. Method according to claim 1, wherein the temperature of the oil is calculated on the basis of a heat flow model.

5. Method for controlling a clutch unit for a drive train of a motor vehicle, the clutch unit including a wet friction clutch for controllable transmission of a torque from an input element to an output element of the clutch unit, oil for cooling the friction clutch, and an actuator for actuating the friction clutch, the method comprising the steps of:
    ascertaining a temperature in the friction clutch;
    adapting as a function of the ascertained temperature, a characteristic curve of the friction clutch that describes the dependence of a clutch torque on an actuator control variable;
    controlling the clutch unit in accordance with the characteristic curve by means of the actuator; and
    wherein, for the adaptation of the characteristic curve, a slope correction value and an offset correction value are determined as a function of the ascertained temperature, wherein a target value of the clutch torque is multiplied by the slope correction value in order to obtain a modified target value of the clutch torque, wherein a temporary target value of the actuator control variable is determined as a function of the modified target value of the clutch torque using the characteristic curve, and wherein the offset correction value is added to the temporary target value of the actuator control variable to obtain a target value of the actuator control variable.

6. Method for controlling a clutch unit for a drive train of a motor vehicle, the clutch unit including a wet friction clutch for controllable transmission of a torque from an input element to an output element of the clutch unit, oil for cooling the friction clutch, and an actuator for actuating the friction clutch, the method comprising the steps of:
    ascertaining a temperature in the friction clutch;
    adapting as a function of the ascertained temperature, a characteristic curve of the friction clutch that describes the dependence of a clutch torque on an actuator control variable;
    controlling the clutch unit in accordance with the characteristic curve by means of the actuator; and
    wherein, for control of the clutch unit, a target value of the actuator control variable is determined as a function of a target value of the clutch torque, and the determined target value of the actuator control variable is regulated, wherein an actual value of the actuator control variable is sensed and is compared with the target value of the actuator control variable.

7. Method for controlling a clutch unit for a drive train of a motor vehicle, the clutch unit including a wet friction clutch for controllable transmission of a torque from an input element to an output element of the clutch unit, oil for cooling the friction clutch, and an actuator for actuating the friction clutch, the method comprising the steps of:
    ascertaining a temperature in the friction clutch;
    adapting as a function of the ascertained temperature, a characteristic curve of the friction clutch that describes the dependence of a clutch torque on an actuator control variable;
    controlling the clutch unit in accordance with the characteristic curve by means of the actuator; and
    wherein a heat input is ascertained as a function of the clutch torque and a difference between the speed of the input element and the speed of the output element of the clutch unit.

8. Method according to claim 7, wherein a time integral is formed by means of the product of clutch torque and speed difference to ascertain the heat input.

9. Method for controlling a clutch unit for a drive train of a motor vehicle, the clutch unit including a wet friction clutch for controllable transmission of a torque from an input element to an output element of the clutch unit, oil for cooling the friction clutch, and an actuator for actuating the friction clutch, the method comprising the steps of:
    ascertaining a temperature in the friction clutch;
    adapting as a function of the ascertained temperature, a characteristic curve of the friction clutch that describes the dependence of a clutch torque on an actuator control variable;
    controlling the clutch unit in accordance with the characteristic curve by means of the actuator; and
    wherein at least one of a slope and an offset of the characteristic curve are modified for the adaptation of the characteristic curve.

\* \* \* \* \*